(12) United States Patent
Katchmart et al.

(10) Patent No.: US 8,879,190 B1
(45) Date of Patent: Nov. 4, 2014

(54) METHOD AND APPARATUS FOR INITIAL SELF-SERVO WRITING

(75) Inventors: Supaket Katchmart, San Jose, CA (US); David Liaw, Newark, CA (US); Jerome F. Richgels, Sunnyvale, CA (US); Henri Sutioso, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 60 days.

(21) Appl. No.: 13/554,642

(22) Filed: Jul. 20, 2012

Related U.S. Application Data

(60) Provisional application No. 61/521,226, filed on Aug. 8, 2011.

(51) Int. Cl.
*G11B 5/02* (2006.01)
(52) U.S. Cl.
USPC .......................................................... 360/55
(58) Field of Classification Search
None
See application file for complete search history.

(56) References Cited

U.S. PATENT DOCUMENTS

| | | | | |
|---|---|---|---|---|
| 5,253,131 A | * | 10/1993 | Chevalier | 360/78.14 |
| 6,704,156 B1 | * | 3/2004 | Baker et al. | 360/75 |
| 6,738,205 B1 | * | 5/2004 | Moran et al. | 360/17 |
| 6,747,836 B2 | * | 6/2004 | Stevens et al. | 360/78.05 |
| 7,199,956 B1 | * | 4/2007 | Moser et al. | 360/46 |
| 7,209,312 B1 | * | 4/2007 | Sutardja | 360/77.07 |
| 8,023,216 B1 | * | 9/2011 | Cheung et al. | 360/51 |
| 2011/0292546 A1 | * | 12/2011 | Tung et al. | 360/135 |
| 2012/0087036 A1 | * | 4/2012 | Hirano et al. | 360/77.04 |

* cited by examiner

*Primary Examiner* — Peter Vincent Agustin

(57) ABSTRACT

Embodiments of the present disclosure provide a method of self-servo writing, the method comprising actions of positionally tracking a selected timing track of a data storage disk, wherein the selected timing track has one or more timing segments; synchronizing an angular position signal to rotation of the data storage disk based on at least one of the one or more timing segments of the selected timing track; specifying servo sector positions relative to the synchronized angular position signal; writing servo sectors to the data storage disk at the specified servo sector positions relative to the synchronized angular position signal; detecting one or more positional errors in timing segments of a next timing track of the data storage disk based at least in part on the synchronized angular position signal; and accounting for the detected one or more positional errors in writing subsequent servo tracks. Other embodiments are also described.

21 Claims, 6 Drawing Sheets

METHOD AND APPARATUS FOR INITIAL SELF-SERVO WRITING

CROSS-REFERENCE TO RELATED APPLICATION

The present disclosure claims priority to U.S. Provisional Patent Application 61/521,226, filed on Aug. 8, 2011, which is hereby incorporated herein by reference in its entirety except for those sections, if any, that are inconsistent with this disclosure.

TECHNICAL FIELD

This disclosure relates to disk drives for computer systems. More particularly, this disclosure relates to self-servo writing methods and systems for data storage devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Disk drives for computer systems have a rotating disk and a head that is moved radially over the disk for writing and reading data. The disk is typically divided into a number of concentric, radially spaced servo tracks, and each servo track is divided into a number of data sectors. The disk is accessed a sector at a time by positioning the head over the servo track that contains the desired data sector. As the disk spins, the head creates magnetic transitions in the data sector to record data, or senses previously created transitions to read previously recorded data.

The physical locations of servo tracks and sectors are typically defined by servo segments or sectors that are written at precise locations on the disk during an initialization process. As storage densities increase, it becomes increasingly important that the servo tracks and sectors are positioned very precisely.

Servo sectors can be written to disks during a manufacturing process, using specialized equipment. However, it is more economical to perform "self-servo writing" (SSW), in which the servo tracks are written by the assembled hard disk assembly itself.

SUMMARY

In various embodiments, the present disclosure provides a method of self-servo writing, the method comprising actions of positionally tracking a selected timing track of a data storage disk, wherein the selected timing track has one or more timing segments; synchronizing an angular position signal to rotation of the data storage disk based on at least one of the one or more timing segments of the selected timing track; specifying servo sector positions relative to the synchronized angular position signal; writing servo sectors to the data storage disk at the specified servo sector positions relative to the synchronized angular position signal; detecting one or more positional errors in timing segments of a next timing track of the data storage disk based at least in part on the synchronized angular position signal; and accounting for the detected one or more positional errors in writing subsequent servo tracks. Other embodiments are also described and claimed.

There is also provided a disk drive comprising a data storage disk; a data head positioned to read from and write to the data storage disk; and a drive controller that is configured to perform actions, wherein the actions comprise positionally tracking a selected timing track of a data storage disk with the data head, wherein the selected timing track has one or more timing segments; synchronizing an angular position signal to rotation of the data storage disk based on at least one of the one or more timing segments of the selected timing track; specifying servo sector positions relative to the synchronized angular position signal; writing servo sectors to the data storage disk at the specified servo sector positions relative to the synchronized angular position signal; detecting one or more positional errors in timing segments of a next timing track of the data storage disk based at least in part on the synchronized angular position signal; and accounting for the detected one or more positional errors in writing subsequent servo tracks.

There is also provided a drive controller included in a disk drive, the drive controller configured to positionally track a selected timing track of a data storage disk with a data head that is positioned to read from and write to a data storage disk, wherein the selected timing track has one or more timing segments; synchronize an angular position signal to rotation of the data storage disk based on at least one of the one or more timing segments of the selected timing track; specify servo sector positions relative to the synchronized angular position signal; write servo sectors to the data storage disk at the specified servo sector positions relative to the synchronized angular position signal; and detect one or more positional errors in timing segments of a next timing track of the data storage disk based at least in part on the synchronized angular position signal.

BRIEF DESCRIPTION OF THE DRAWINGS

Embodiments of the present disclosure will be readily understood by the following detailed description in conjunction with the accompanying drawings. To facilitate this description, like reference numerals designate like structural elements.

DETAILED DESCRIPTION

The following description is merely exemplary in nature and is in no way intended to limit the disclosure, its application, or uses.

Figure 1:
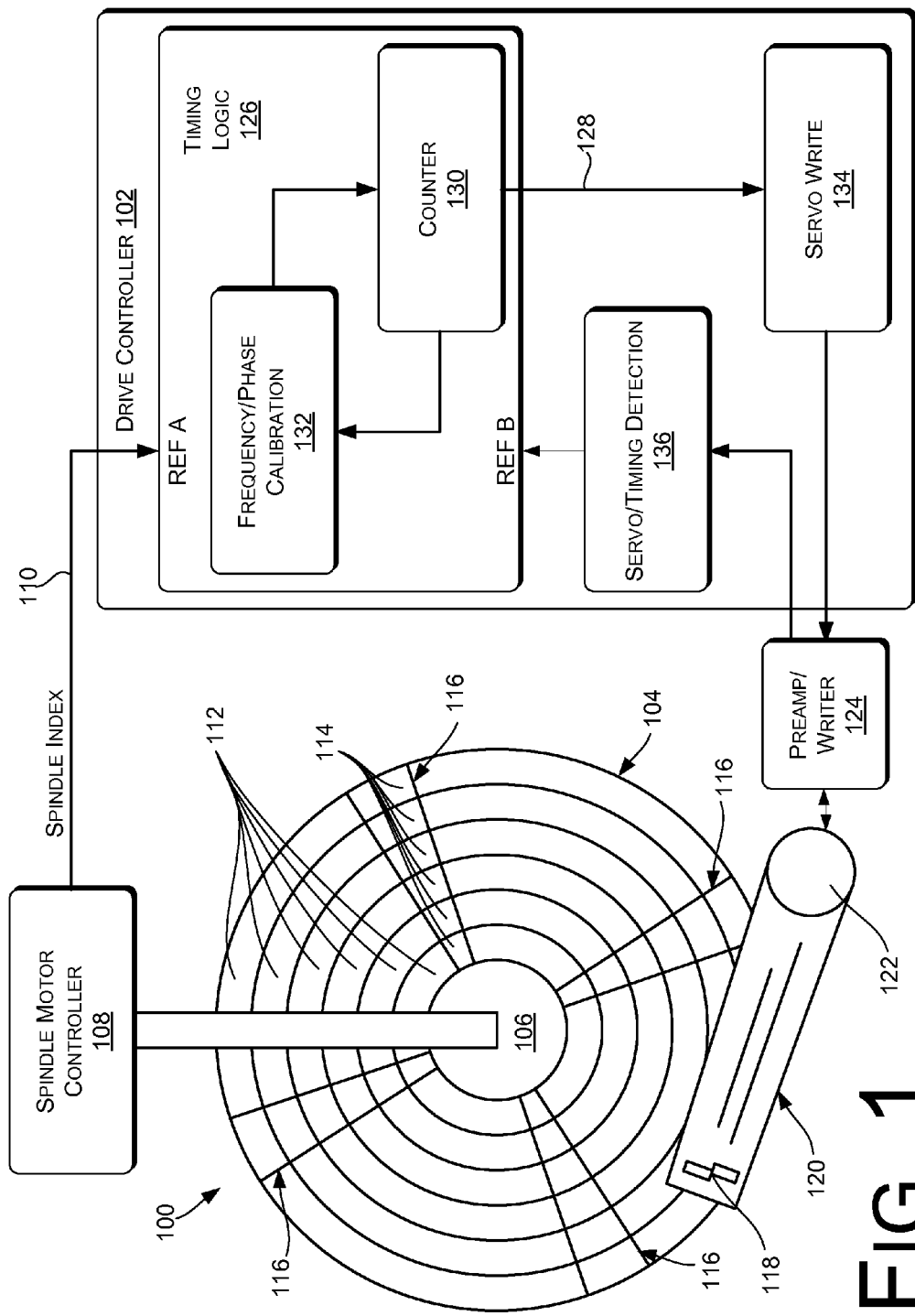
FIG. 1 is a functional block diagram of a hard disk drive system incorporating self-servo writing techniques in accordance with an embodiment of the present disclosure.

FIG. 1 is a block diagram showing an example magnetic-media disk drive that employs self-servo write techniques. The disk drive includes a head-disk assembly (HDA) 100 and a drive controller 102. The HDA 100 includes one or more disks 104 mounted on an integrated spindle and motor assembly 106.

The HDA 100 includes a spindle motor controller 108 to control the rotation and speed of the disk 104. The spindle motor controller 108 generates a spindle index 110, also referred to as a mechanical index signal (MIDX). The spindle index 110 may be generated once for each 360 degree rotation of the spindle 106, at a particular angular position of the spindle 106. Alternatively, the spindle index 110 may be generated multiple times during each 360 degree rotation of the spindle 106, indicating corresponding angular positions of the spindle. In some embodiments, the spindle index 110 may be derived from a back electromagnetic force (BEMF) signal that is a characteristic of the spindle and motor assembly 106.

Although the disk 104 is initially unformatted or blank, FIG. 1 illustrates an example of a formatted disk layout. When formatted, the disk 104 comprises a number of concentric servo tracks 112. Each servo track 112 has a number of servo sectors 114. The servo sectors 114 may be distributed evenly around each servo track 112. Servo sectors 114 of different servo tracks are positioned at the same angular positions relative to the disk 104, resulting in a plurality of radially extending sets 116 of servo sectors 114 which may be referred to as "spokes" or "wedges" 116. It is important in many implementations for the servo sectors 114 to be positioned very precisely at the same angular position from one servo track to another.

A data head or read/write head 118 on an arm 120 can be positioned as needed over the servo tracks 112 to read and write data on the disk 104. A motor 122, such as a voice coil motor (VCM) or servo control motor, can be used to position the head over a desired servo track 112. The arm 120 can be a pivoting or sliding arm and can be spring-loaded to maintain a proper flying height for the read/write head 118 in any drive orientation. A closed-loop head positioning system can be used.

The HDA 100 can include a preamp/writer 124, where head selection and sense current value(s) can be set. The preamp/writer 124 can amplify a read signal before outputting it to the drive controller 102.

The drive controller 102 may comprise various logic and/or modules for operating the HDA 100 during initialization, formatting, and normal operation. Illustrated in FIG. 1 are logical elements or functionality related to the techniques described below, for self-writing servo tracks on a disk. The various illustrated elements may be implemented by software, hardware, or combinations thereof. In some implementations, the operations or functions of the drive controller 102 may be implemented by a software program. For example, the drive controller may have executable instructions embodied upon computer readable media, wherein the instructions are executable or operable to perform the actions described below with respect to the HDA 100. In some cases, the software and/or the drive controller, or portions of the drive controller functionality, may be implemented by one or more devices that are external to the disk drive, such as by a computer with which the disk drive is associated. Thus, the components and signals described as being part of the drive controller 102 are intended to represent logical functionality, rather than discrete physical or electrical elements of the disk drive.

In an embodiment, timing logic 126 is provided for generating timing and positional information related to rotation of the disk 104. The timing logic 126 produces an angular position signal 128 that indicates the angular position of the disk 104 relative to the read/write head 118 at any given time. In certain implementations, the timing logic 126 comprises a modulo counter 130 having a multi-bit digital output that forms the angular position signal 128. The modulo counter 130 is configured to reset upon every rotation of the disk 104. Alternatively, the modulo counter 130 may be configured to reset at intervals or counts equal to the expected intervals between servo sectors 114 of the disk 104. In some embodiments, two or more modulo counters 130 are provided to indicate different intervals or sub-intervals of disk rotation.

In an embodiment, the timing logic 126 also includes frequency/phase calibration logic 132 that operates in conjunction with the modulo counter 130 to synchronize the phase and frequency of the counter 130 to the rotation of the disk 104. The frequency/phase calibration logic 132 adjusts the phase and frequency of the counter 130 to minimize errors between a periodic reference input and the output of the counter 130. In the described embodiment, the timing logic 126 is configured to select either one of two periodic reference inputs, referred to herein as REF A and REF B. The REF A input is logically connected to the spindle index 110, and allows the angular position signal 128 to be synchronized to the spindle index 110. The REF B input is responsive to the detection of servo or timing information that has been written to the disk 104, as will be explained in more detail below. The frequency/phase calibration logic 132 and the counter 130 operate in a closed-loop manner, such as a phase-locked loop, to lock the period of the counter 130 to a selected one of the periodic reference inputs REF A and REF B.

The drive controller 102 also includes logic for servo write 134 that may be activated to write servo and timing information to the disk 104. The servo information comprises servo bursts or pairs, track address or identification, sector addresses, and so forth. Timing information includes timing or seed tracks that are used during initial formatting, as will be described in more detail below.

The drive controller 102 also includes logic for servo and timing detection 136 that detects servo and timing information that has previously been written to the disk 104.

In operation, the timing logic 126 is initially configured so that it synchronizes the angular position signal 128 to the spindle index 110, through the reference input REF A. The spindle index 110 may exhibit a certain amount of jitter, and may thus be unsuitable as a reference for accurately positioning servo tracks. Accordingly, rather than writing servo tracks or sectors, the drive controller 102 is configured to initially write a sequence of timing tracks or seed tracks to the disk 104, in synchronization with the spindle index 110. Once such timing tracks are written, the timing logic 126 is configured to no longer rely on the spindle index 110, but rather to synchronize the angular position signal 128 based on timing information embedded in the timing tracks, as received at the reference input REF B. When moving from one timing track to a new or next timing track, inter-track errors are measured so that jitter-induced errors in the new timing track may be accounted for when synchronizing the position signal 128 with the new timing track. This allows a series of potentially imprecise timing tracks to be used as accurate synchronization references when writing servo sectors to the disk 104.

Figure 2:
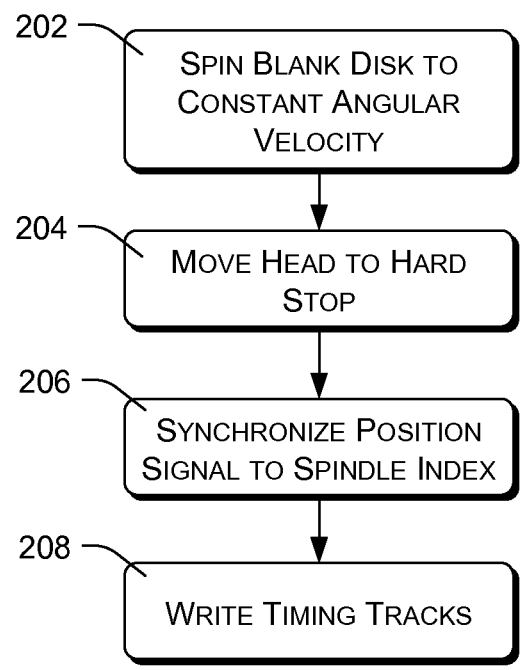
FIGS. 2 and 3 are flowcharts illustrating a method of self-writing initial servo tracks in accordance with an embodiment of the present disclosure.

FIG. 2 shows a process of self-writing timing seed tracks to the disk 104, which can be initially blank or unformatted. At 202, the disk 104 is spun to a constant angular velocity. At 204, the head is moved to a hard stop position. This description assumes the hard stop position is at the inner diameter (ID) of the disk 104, but the systems and techniques described are equally applicable to using the outer diameter (OD) as the initial hard stop position.

At 206, the angular position signal 128 is generated and synchronized with spindle position, so that the angular position signal 128 repeatedly indicates angular positions of the disk relative to the read/write head 118. This may be performed by configuring the timing logic 126 so that it synchronizes the angular position signal 128 with the spindle index 110, as received at the REF A input of the timing logic 126.

Figure 4:
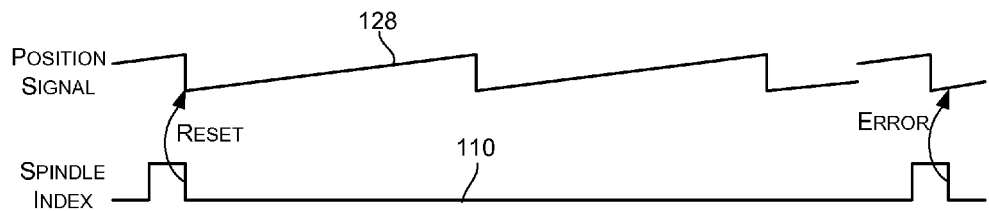
FIGS. 4 and 5 are timing diagrams showing synchronization of an angular position signal with a spindle index in accordance with an embodiment of the present disclosure.
Figure 5:
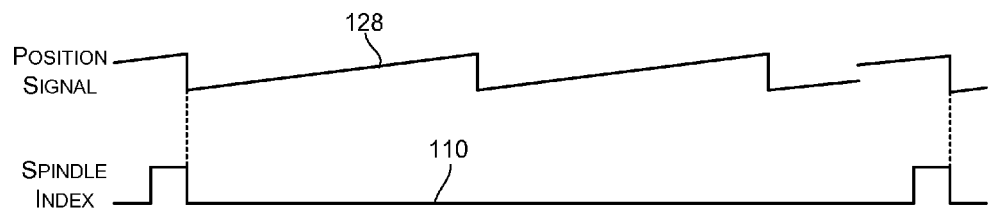

FIGS. 4 and 5 illustrate an example of synchronizing the angular position signal 128 with the spindle index 110. FIG. 4 illustrates an error in synchronization between the angular position signal 128 and the spindle index 110, while FIG. 5 illustrates the angular position signal 128 and the spindle index 110 to be fully synchronized.

In the example of FIGS. 4 and 5, the position signal 128 is generated by the counter 130 of FIG. 1. The counter 130 is responsive to a clock signal provided by or under the control of the frequency/phase calibration logic 132. The counter 130 is configured to reset after every N clock cycles, where N corresponds to the number of clock cycles expected between servo wedges 116 of the disk 104, at the configured rotational speed of the spindle 106 and disk 104. Thus, the counter 130 may reset multiple times during a single disk revolution, and may reset multiple times between each occurrence of the spindle index 110.

In order to synchronize the position signal 128 with the spindle index 110, the counter phase and frequency are adjusted by the frequency/phase calibration logic 132 so that each falling edge of the spindle index 110 aligns with a counter reset. Note that the position signal 128 is represented in FIG. 4 and the following figures as a periodic triangle wave: the counter 130 starts at a zero value and then proceeds with regularly increasing values until reaching the count of N, whereupon it resets to a value of zero. When properly synchronized, the value of the counter 130 corresponds to the angular position of the disk 104, relative to the locations of the servo sectors 114 on the disk 104; each counter reset corresponds to a respective servo sector 114 or servo wedge 116.

To synchronize the timing logic 126 with the spindle index 110, the counter 130 is initially reset by or in response to the spindle index 110, and subsequent errors or misalignments between the position signal 128 and the spindle index 110 are observed.

The position signal errors may be observed over time to determine an appropriate phase and/or frequency adjustment that may be used by the frequency/phase calibration logic 132 to bring the angular position signal 128 into alignment or synchronization with the spindle position signal 108. In some embodiments, the observed errors may be used as an error function of a phase/frequency control loop mechanism implemented by the frequency/phase calibration logic 130.

Synchronization of the position signal 128 with the spindle index 110 is illustrated in FIG. 5. Note that the spindle index 110 may occur multiple times per rotation of the disk 104, which may allow increased precision when synchronizing the position signal 128.

Returning to FIG. 2, at 208, a series or sequence of timing tracks or seed tracks may be written, while synchronizing the position signal 128 to the spindle index 110. The timing tracks may be spaced about the disk 104 based on the synchronized position signal 128.

Figure 6:
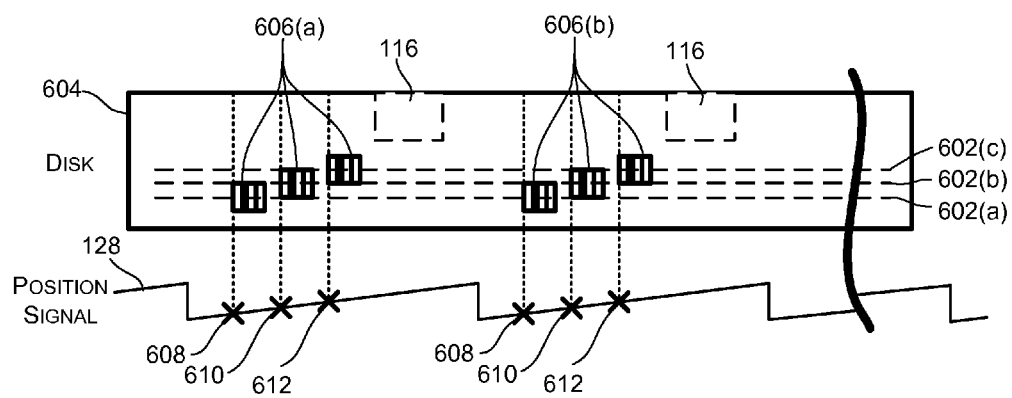
FIG. 6 is a timing diagram showing timing tracks created in accordance with an embodiment of the present disclosure.
Figure 7:
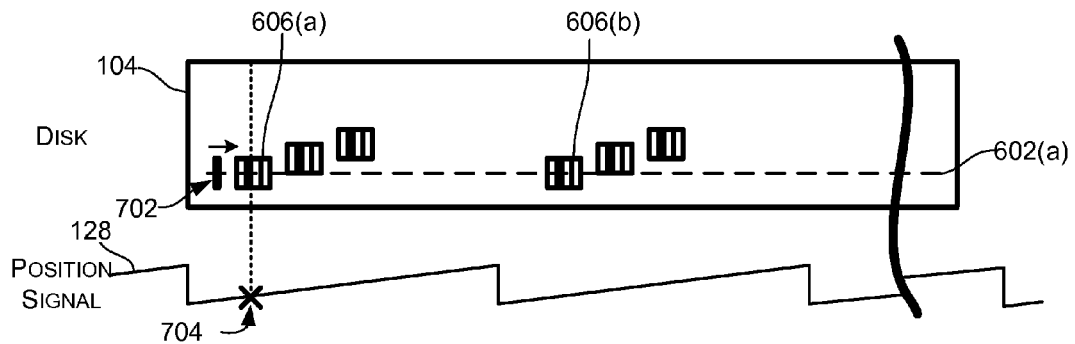
FIGS. 7 and 8 are timing diagrams showing the writing of a servo track in accordance with an embodiment of the present disclosure.
Figure 8:
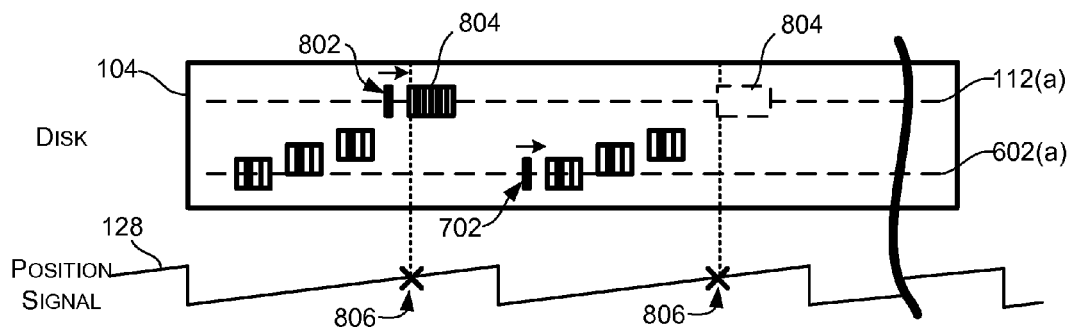
Figure 9:
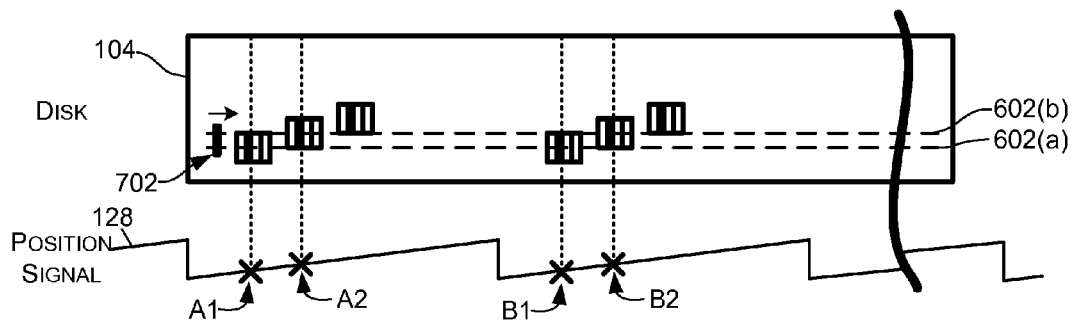
FIG. 9 is a timing diagram showing the detection of positional errors in timing tracks in accordance with an embodiment of the present disclosure.
Figure 10:
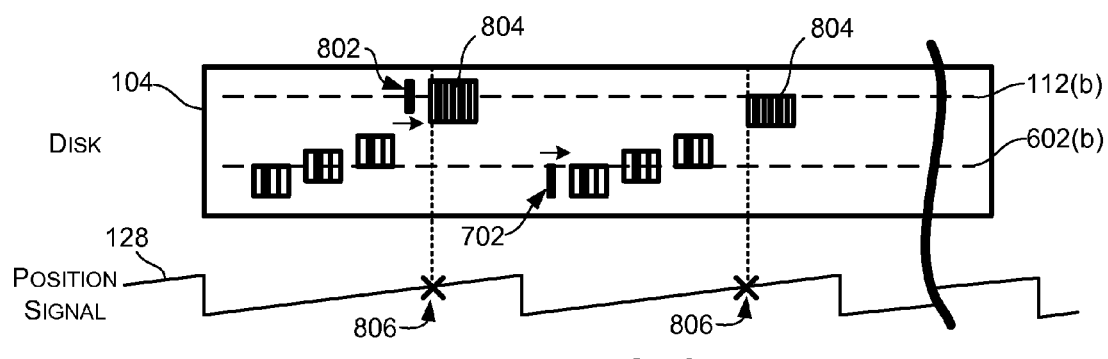
FIG. 10 is a timing diagram showing the writing of an additional servo track in accordance with an embodiment of the present disclosure.

FIGS. 6-10 illustrate various timing diagrams associated with the hard disk drive system of FIG. 1. For example, FIG. 6 shows an example configuration of timing tracks relative to a strip of the disk 104. FIG. 7 illustrates positioning a read head 702 of the read/write head 118 over a first timing track of the disk 104. FIG. 8 illustrates a radial offset between the read head 702 and a write head 802 of the read/write head 118. FIG. 9 illustrates an intermediate placement of the read head 702. FIG. 10 illustrates movement of the read head 702 over a second or next timing track. Each of these figures will be discussed in more detail below.

Referring again to FIG. 6, this figure shows an example configuration of timing tracks 602 relative to a strip 604 of the disk 104. The strip 604 represents a portion of an inner ring of the disk 104. A first timing track 602(a), illustrated at the bottom of the disk strip 604 in FIG. 6, is written when the read/write head 118 is at its full inner stop. Each successively outer timing track 602 is written at a radially outward position such that it partially overlaps with the previous timing track, so that the read/write head 118 may later be positioned to simultaneously read from both of the tracks.

Each timing track 602 includes a plurality of timing segments or servo segments 606, at locations that may subsequently be used to define the relative positions of the servo wedges 116. From one timing track to the next, the servo segments 606 corresponding to a single servo wedge 116 are offset angularly from each other, so that there is a defined angular spacing between the segments 606 corresponding to a single servo wedge 116.

Writing of the servo segments 606 is timed to the synchronized position signal 128. More specifically, the servo segments 606 of a particular timing track 602(a) are written at a first value 608 of the position signal 128. The servo segments 606 of a subsequent, relatively outer timing track 602(b) are written at a second, different value 610 of the position signal 128, and so on, producing the illustrated angular offset between the servo segments 606 of the timing tracks 602.

Note that the position signal 128 may exhibit a degree of jitter during the process of FIG. 2, because it is being synchronized to the relatively imprecise spindle index 110. As a result, the spacings of the servo segments 606 may be relatively imprecise, both within a single timing track and between multiple timing tracks.

Each servo segment 606 may include both servo positioning information and timing information. The timing information may include timing references or segments, such as sync-bit patterns.

In an embodiment, a signal magnitude of servo segments 606(a) indicates a radial position of the read/write head 118. For example, when read/write head 118 is at the radial position 602(a), the read/write head 118 reads an wedge at the position 608 with high signal amplitude (e.g., with a full signal amplitude), while reading an wedge at the position 610 at about half signal amplitude, and may miss an wedge at the position 612 due to very low to non-exist signal amplitude. Accordingly, it may be determined that the read/write head 118 is at the radial position 602(a).

Figure 3:
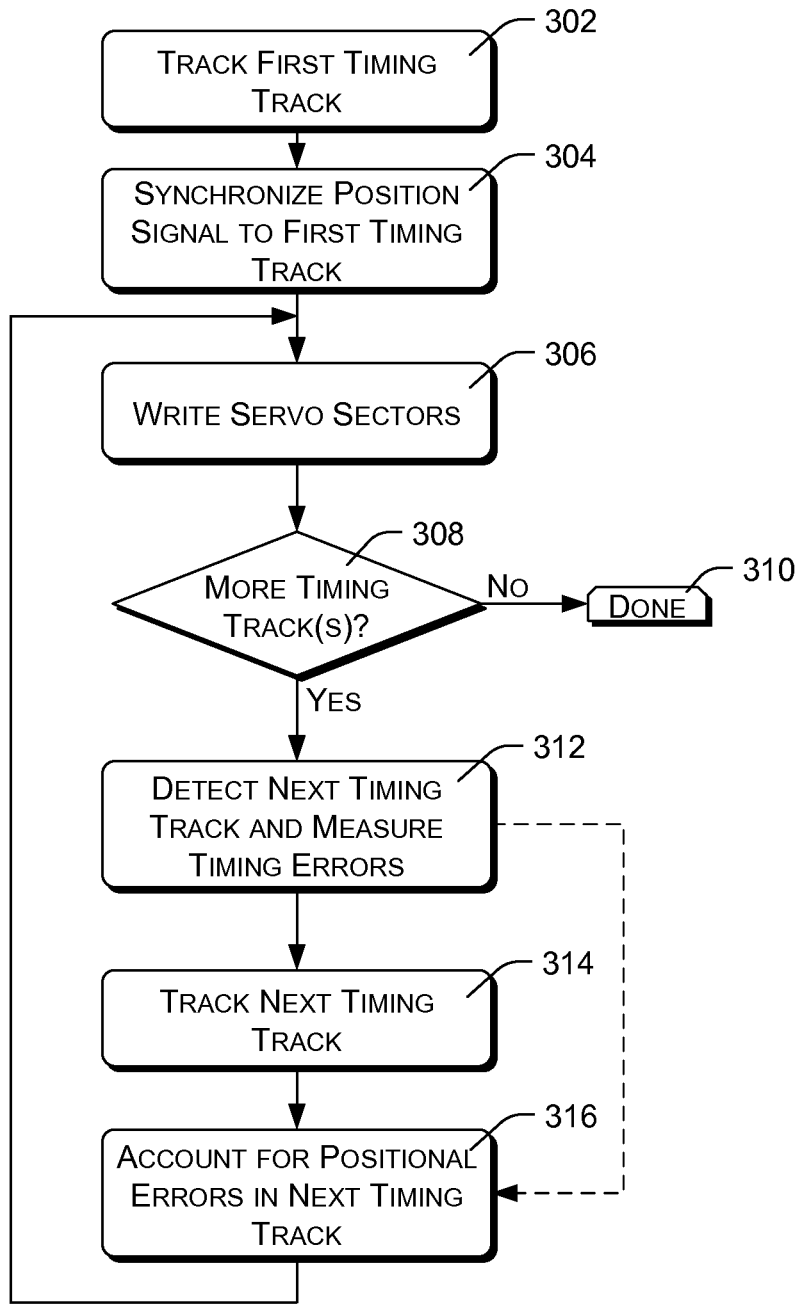

FIG. 3 illustrates a process of self-writing a set of servo tracks based on the timing tracks 602 described above. At 302, the read/write head 118 is positioned over the first or inner timing track 602(a), and configured to positionally track the inner timing track 602(a) based on the servo segments 606 of the timing track 602(a). At 304, the position signal 128 is synchronized to the timing information embedded in the servo segments 606 of the first timing track 602. With reference to FIG. 1, this comprises switching the timing logic 126 so that it is responsive to REF B rather than to REF A. The REF B input is logically connected to receive timing of detected servo segments from the servo/timing detection logic 136.

FIG. 7 illustrates the actions 302 and 304. In FIG. 7, a read head 702 of the read/write head 118 is positioned over the first timing track 602(a) of the disk 104. The servo segments 606 of the first timing track 602(a) are used to maintain alignment of the read head 702 with the first timing track 602(a) and to provide timing information regarding rotation of the disk 104.

The value 704 of the position signal 128 is observed upon detection of a first or selected one of the servo segments 606(a) of the first timing track 602(a). This position value 704 is used by the phase/frequency calibration logic 132 to adjust the phase and frequency of the counter 130 for synchronization with the periodic and constant-speed rotation of the disk 104. Position signal values at subsequent servo segments may also be observed to improve the synchronization of the position signal 128 with disk rotation. However, due to the jitter of the spindle index 110, the relative spacings of the servo segments 606 within a single timing track 602 may also exhibit a degree of jitter. This jitter may be accounted for as described below when synchronizing the position signal 128.

In some embodiments, repeatedly observed values 704 of the position signal 128 at the selected servo segment 606(a) may be used as feedback or input to a phase/frequency control loop mechanism implemented by the frequency/phase calibration logic 130.

A single servo segment 606, such as, for example, the servo segment 606(a), provides an accurate and relatively jitter-free indication of disk rotation. When used as the basis for synchronizing the counter 130, the position signal 128 can be calibrated to accurately track rotation of the disk 104 over repeated revolutions, with a very high degree of repeatability. In addition, the relative jitter or error in the actual placement of remaining servo segments 606 of the timing track 602 may be evaluated by noting or recording the values of the synchronized position signal 128 at those servo segments 606.

Returning to FIG. 3, at 306, servo sectors 114 are written to the disk 104. Positions of the servo sectors 114 are specified relative to the position signal 128, which is synchronized as described above to a selected one of the servo segments 606 of the currently tracked timing track 602, which may also be referred to herein as the selected timing track. Servo sectors 114 are written to the disk 104 at the specified positions of the servo sectors, relative to the synchronized position signal 128.

FIG. 8 shows a write head 802 of the read/write head 118. The read/write head 118 is configured so that there is a radial offset between the read head 702 and the write head 802. Thus, when the read head 702 is positioned over the selected timing track 602(a), the write head is positioned over a corresponding servo track 112(a) that is radially offset from the selected timing track 602(a). Accordingly, radially tracking the selected timing track 602(a) with the read head 702 provides a reliable and accurate mechanism for establishing radial position of the read/write head 118 for writing sectors of the servo track 112(a).

A sector 804 is written at an angular location along the servo track 112(a) corresponding to a chosen value 806 of the position signal 128. The same value 806 is used for writing multiple servo sectors to the track 112(a), as well as for writing the servo sectors of other tracks. This results in servo sectors 114 being written at locations of the servo wedges 116 illustrated in FIG. 1.

Returning again to FIG. 3, at 308 the process determines whether there are any additional or next timing tracks 602. If not, the process is done. If there are more timing tracks 602, at 310, the process continues at 312.

At 312, the read head 702 is moved radially to detect the next or adjacent timing track 602(b), and to detect or measure positional errors in servo or timing segments of the next timing track 602(b) relative to the servo segments of the original servo track 602(a). For purposes of this discussion, the "next" timing track is considered to be the track that is adjacently overlapping the currently selected or tracked timing track. Positional errors exhibited by the servo segments 606 of the timing track 602(b) may be evaluated based on the position signal 128, which remains synchronized with the first timing track 602(a).

FIG. 9 illustrates this intermediate placement of the read head 702. As shown, the read head 702 is positioned midway between the timing tracks 602(a) and 602(b) so that the read head 702 can detect the servo segments 606 of both tracks. During this process, the positions of the servo segments of the first track 602(a) are known relative to the position signal 128, and the servo segments of the second track 602(b) are assumed to follow within a known angular distance.

While continuing to synchronize the position signal 128 to the timing references of the first track 602(a) as described above, the actual locations of relevant servo segments 606 are recorded, relative to the values of the position signal 128. More specifically, the values of the position signal 128 are recorded at the positions of the servo segments 606 of the selected track 602(a) and the servo segments 606 of the next track 602(b). This effectively records the positional error of each servo segment 606 relative to the synchronized position signal 128. During this process, it is assumed that the selected servo segment 606(a) of the first timing track 602(a) has been used as a synchronization reference, and therefore exhibits no positional error. Accordingly, positional errors are specified relative to the selected servo segment 606(a) segment of the first timing track.

At 314 of FIG. 3, the read head 702 is moved over the second or next timing track 602(b) and is configured to radially track the second timing track 602(b). This condition is illustrated by FIG. 10. At 316, the position signal 128 is resynchronized to the rotation of the disk 104 by referencing one or more of the servo segments 606 of the second timing track 602(b).

While synchronizing the position signal 128 to the second servo track 602(b), and while also accounting for radial positional errors in placement of the servo segments of the second servo track 602(b), the action 306 is repeated with the next timing track being now designated as the selected timing track, and another set of servo sectors 114 is written to the disk 104. The actions 312, 314, and 316 are repeated with successively selected timing tracks 606 until all of the timing tracks 602 have been processed and servo tracks 112 corresponding to all of the timing tracks 606 have been written. At each iteration, at 312, inter-track positioning errors are evaluated, and are accounted for at 316 before writing the next servo track 112 at 306.

The observed positional errors of the timing tracks may be accounted for in various ways. For example, synchronization of the position signal 128 with the timing segments may be performed after accounting or correcting for the positional errors of the timing segments 606. Alternatively, the positions of the servo sectors 114 may be adjusted when performing the writing 306 to account for the observed positional errors of the timing segments 606.

After writing an initial set of servo tracks 112 in the manner described above, additional servo tracks may be propagated from the tracks already written.

The description incorporates use of the phrases "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "component," and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method performable by read/write head of a disk drive to write a plurality of servo tracks onto a disk, wherein each servo track comprises one or more servo sectors, the method comprising:
   rotating the disk at a constant angular velocity;
   (i) based on an angular position of the read/write head to the disk and (ii) while the disk is rotating at the constant angular velocity, writing, via the read/write head, a sequence of timing tracks onto the disk;
   positionally tracking a selected timing track of the sequence of timing tracks, wherein the selected timing track has one or more timing segments;
   synchronizing an angular position signal to the rotation of the disk based on at least one of the one or more timing segments of the selected timing track;
   specifying servo sector positions relative to the synchronized angular position signal;
   writing servo sectors to the disk at the specified servo sector positions relative to the synchronized angular position signal;
   detecting one or more positional errors in timing segments of a next timing track of the disk based at least in part on the synchronized angular position signal; and
   accounting for the detected one or more positional errors in writing subsequent servo sectors.

2. The method of claim 1, wherein accounting for the detected one or more positional errors comprises adjusting the specified servo sector positions based at least in part on the one or more positional errors.

3. The method of claim 1, wherein accounting for the detected one or more positional errors comprises correcting for the detected one or more positional errors when synchronizing the angular position signal.

4. The method of claim 1, further comprising:
   initially synchronizing the angular position signal to rotation of the disk based on a spindle index; and
   writing the timing segments to the disk at locations that are determined based at least in part on the angular position signal when the angular position signal is synchronized based on the spindle index.

5. The method of claim 4, wherein the spindle index comprises a back-EMF signal.

6. The method of claim 4, wherein the timing tracks are radially overlapping.

7. The method of claim 4, wherein an individual timing segment of the next timing track is positioned within a predefined angular distance following a corresponding individual timing segment of the selected timing track.

8. The method of claim 1, wherein detecting one or more positional errors in timing segments of the next timing track of the disk comprises:
   recording an actual location of a timing segment of the next timing track of the disk;
   detecting a location of the timing segment of the next timing track of the disk, as indicated by the synchronized angular position signal;
   comparing (i) the recorded actual location of the timing segment of the next timing track of the disk and (ii) the location of the timing segment of the next timing track of the disk, as indicated by the synchronized angular position signal; and
   based on comparing (i) the recorded actual location of the timing segment of the next timing track of the disk and (ii) the location of the timing segment of the next timing track of the disk, as indicated by the synchronized angular position signal, detecting a positional error in the timing segment of the next timing track of the disk.

9. A disk drive comprising:
   a disk;
   a read/write head configured to, while the disk is rotating at a constant angular velocity, write a sequence of timing tracks onto the disk;
   a data head positioned to read from and write to the disk; and
   a drive controller that is configured to
      positionally track a selected timing track of the sequence of timing tracks with the data head, wherein the selected timing track has one or more timing segments,
      synchronize an angular position signal to the rotation of the disk based on at least one of the one or more timing segments of the selected timing track,
      specify servo sector positions relative to the synchronized angular position signal,
      facilitate writing servo sectors to the disk at the specified servo sector positions relative to the synchronized angular position signal,
      detect one or more positional errors in timing segments of a next timing track of the disk based at least in part on the synchronized angular position signal, and
      account for the detected one or more positional errors in writing subsequent servo sectors.

10. The disk drive of claim 9, wherein the drive controller is configured to, in accounting for the detected one or more positional errors, adjust the specified servo sector positions based at least in part on the one or more positional errors.

11. The disk drive of claim 9, wherein the drive controller is configured to, in accounting for the detected one or more positional errors, correct for the detected one or more positional errors when synchronizing the angular position signal.

12. The disk drive of claim 9, wherein the drive controller is further configured to:
   initially synchronize the angular position signal to rotation of the disk based on a spindle index; and
   write the timing segments to the disk at locations that are determined based at least in part on the angular position signal when the angular position signal is synchronized based on the spindle index.

13. The disk drive of claim 12, wherein the spindle index comprises a back-EMF signal.

14. The disk drive of claim 12, wherein timing tracks are radially overlapping.

15. The disk drive of claim 12, wherein an individual timing segment of the next timing track is positioned within a predefined angular distance following a corresponding individual timing segment of the selected timing track.

16. A drive controller included in a disk drive, the drive controller comprising:
   timing logic configured to
      positionally track a selected timing track of a disk with a data head that is positioned to read from and write to a disk, wherein the selected timing track has one or more timing segments,
      synchronize an angular position signal to rotation of the disk based on at least one of the one or more timing segments of the selected timing track, and
      specify servo sector positions relative to the synchronized angular position signal;
   servo write logic configured to
      facilitate writing servo sectors to the disk at the specified servo sector positions relative to the synchronized angular position signal; and
   servo and timing detection logic configured to
      detect one or more positional errors in timing segments of a next timing track of the disk based at least in part on the synchronized angular position signal.

17. The drive controller of claim 16, wherein the drive controller configured to, in accounting for the detected one or more positional errors, adjust the specified servo sector positions based at least in part on the one or more positional errors.

18. The drive controller of claim 16, wherein the drive controller configured to, in accounting for the detected one or more positional errors, correct for the detected one or more positional errors when synchronizing the angular position signal.

19. The drive controller of claim 16, wherein the drive controller is further configured to:
   initially synchronize the angular position signal to rotation of the disk based on a spindle index; and
   write the timing segments to the disk at locations that are determined based at least in part on the angular position signal when the angular position signal is synchronized based on the spindle index.

20. The drive controller of claim 19, wherein the spindle index comprises a back-EMF signal.

21. The drive controller of claim 19, wherein timing tracks are radially overlapping.

* * * * *